3,781,364
SATURATION OF UNSATURATED ALDEHYDES
Donald M. Fenton, Anaheim, Calif., assignor to Union Oil Company of California, Los Angeles, Calif.
No Drawing. Filed Apr. 27, 1970, Ser. No. 32,464
Int. Cl. C07c 45/12
U.S. Cl. 260—601 R        6 Claims

ABSTRACT OF THE DISCLOSURE

It is disclosed that ethylenically unsaturated aldehydes can be saturated without hydrogenation of the aldehyde group by contacting the aldehyde with carbon monoxide and water in the presence of a rhodium, iridium or ruthenium complex with a biphyllic ligand catalyst. The reaction is performed under relatively mild conditions at temperatures from 30° to 300° C. and at pressures from 1 to about 1000 atmospheres using an aqueous liquid phase having dispersed or dissolved therein the catalytic quantities of the noble metal-biphyllic ligand complex.

DESCRIPTION OF THE INVENTION

This invention relates to the saturation of ethylenically unsaturated aldehydes and in particular relates to a catalyst for effecting the saturation without the use of molecular hydrogen.

In various chemical processes, ethylenically unsaturated aldehydes are formed as byproducts of the desired reaction. These unsaturated aldehydes could be converted to useful products, e.g., to saturated aldehydes, by hydrogenation and some prior investigators have reported that complexes of cobalt with biphyllic ligands are catalysts for the saturation of such aldehydes without the hydrogenation of the functional aldehyde group; see Pat. 3,130,237. These processes, however, employ, as a reactant, molecular hydrogen which is commonly produced by a shift reaction, i.e., the reaction of carbon monoxide and water at relatively high temperatures.

It has now been discovered that biphyllic ligand complexes of certain noble metals, e.g., rhodium, iridium and ruthenium, will catalyze the saturation of unsaturated aldehydes using carbon monoxide and water as the reducing reactants. In the reaction, carbon monoxide is oxidized to carbon dioxide and the enhanced hydrogen content of the aldehyde product is derived from the hydrogen of the water. It is surprising that this reaction occurs at the relatively mild conditions which are employed for the saturation of the aldehyde and that such saturation can be performed selectively on the ethylenically unsaturated carbons without hydrogenation of the functional aldehyde group.

This invention, therefore, comprises the contacting of an ethylenically unsaturated aldehyde with carbon monoxide and water in the presence of a biphyllic ligand complex of rhodium, ruthenium or iridium at temperatures from about 30° to 300° C. and pressures from about 1 to about 1000 atmospheres. The products of the reaction are the saturated aldehyde and carbon dioxide.

The reaction can be performed on any acyclic, monoethylenically unsaturated aldehyde having from 2 to about 20 carbons. Examples of suitable aldehydes include acrolein, butenic aldehydes such as crotonaldehyde, isocrotonaldehyde, vinyl acetaldehyde, methacrolein; pentenic aldehydes such as tiglic, angelic, senecioic, hexenic aldehydes; teracrylic, heptenoic, octenoic, dodecenoic, hypogeic, oleic, elaidic aldehydes, etc.

The reaction is performed under liquid phase conditions and in the presence of an aqueous or partially aqueous solvent. The amount of water in the reaction zone can be from about 5 to about 95, preferably from 10 to 50, weight percent of the reaction zone contents and can be in admixture with the aldehyde reactant or any suitable inert organic solvent. Entirely miscible solvent mixtures are preferred when organic liquids are used to simplify the mass transfer considerations; however, immiscible solvent mixtures can be used with sufficient agitation to insure interdispersion of the phases during reaction.

When the aldehyde comprises a liquid at the reaction conditions, an excess amount of aldehyde can be used and thereby form a suitable liquid reaction medium in admixture with the water. If desired, however, any suitable organic liquid can be used as a reaction solvent; preferably organic liquids which are inert to the reaction conditions, the reactants, and the catalysts are employed. When the higher molecular weight aldehydes are used which are solids at ambient handling conditions, they can be dissolved in the solvent to facilitate their handling and introduction into the reaction zone. Examples of suitable solvents which can be used in accordance with my invention include hydrocarbons such as the aromatic, aliphatic, alicyclic, hydrocarbons, ethers, etc.

Examples of suitable hydrocarbons that can be employed in the solvents include aromatic hydrocarbons such as benzene, toluene, xylene, ethylbenzene, Tetralin, etc.; aliphatic hydrocarbons such as butane, pentane, isopentane, hexane, isohexane, heptane, octane, isooctane, naphtha, gasoline, cyclopentane, cyclohexane, methylcyclopentane, Decalin, indane, etc.

Ethers can also be employed as the reaction solvent, e.g., diisopropyl ether, di-n-butyl ether, ethylene glycol diisobutyl ether, methyl o-tolyl ether, ethylene glycol bibutyl ether, diisoamyl ether, methyl p-tolyl ether, methyl m-tolyl ether, dichloroethyl ether, ethylene glycol diisoamyl ether, diethylene glycol diethyl ether, ethyl benzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

The catalyst comprises a complex between ruthenium, rhodium or iridium and a biphyllic ligand. The biphyllic ligand is a compound of phosphorus or arsenic having at least one atom with a pair of electrons capable of forming a coordinate covalent bond with a metal atom and simultaneously having the ability to accept the electron from the metal thereby imparting additional stability to the resulting complex. Biphyllic ligands can comprise organic compounds having at least about 3 carbons which contain arsenic or phosphorus in a trivalent state. Of these, the phosphorus compounds, i.e., the phosphines or phosphites are preferred; however, the arsines can also be employed. In general, these biphyllic ligands having the following structure:

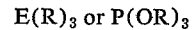

$$E(R)_3 \text{ or } P(OR)_3$$

wherein E is trivalent arsenic or phosphorus; and wherein R is the same or different hydrocarbyl group selected from the class consisting of aryl containing from 6 to about 10 carbons and alkyl containing from 1 to about 10 carbons.

Examples of suitable biphyllic ligands having the aforementioned structure and useful in my invention with the ruthenium are the following: phenyldimethyl phosphine, di(n-butyl)phosphine, diethyl phosphite, triamyl arsine, diphenylethyl arsine, phenyldibutyl arsine, diphenylmethyl phosphite, cumyldiisopropyl phosphine, tri(tolyl)phosphite, dixylylhexyl phosphine, triphenyl phosphine, triphenyl phosphite, trixylyl arsine, tridiuryl phosphine, phenyldiisopropyl arsine, phenyldiamyl phosphine, diethylnaphthyl phosphine, p-hexylphenyldixylyl phosphine, etc. Of the aforementioned, aryl-containing phosphines or phosphites are preferred; the diaryl alkyl phosphines are more preferred; and the triaryl phosphines are most preferred.

The active metal component of the catalyst is ruthenium, rhodium or iridium and, of these, rhodium is preferred because of its greater activity. The metal component can be added to the reaction zone in any suitable form, e.g., as the metal, as a complex, salt or oxide. Examples of suitable additives which can be used include ruthenium, rhodium or iridium salts such as the salts of strong inorganic acids or aliphatic and aromatic acids, e.g., ruthenium nitrate, iridium nitrate, rhodium chloride, ruthenium bromide, iridium iodide, rhodium fluoride, ruthenium sulfate, etc., as well as ruthenium oxide, iridium oxide, rhodium oxide, ruthenium metal, rhodium metal or iridium metal, the latter metallic states being employed in powder or finely subdivided form, etc. Examples of other suitable complex sources include the carbonyls, e.g., rhodium carbonyl, ruthenium carbonyl, iridium carbonyl, the halo, amino or hydrydo complexes, e.g., ammonium hexachlororhodate, chloropentaaminorhodium chloride, tetraaminoruthenium hydroxylchloro chloride, ammonium hexachloroiridate, chloroiridic acid, iridium carbonyl, potassium hexachloroiridate, etc.

The noble metal component can be added as a solid, as a solution, or can be distended on a suitable inert support by impregnating the support with any of the aformentioned sources of the metal component. Examples of suitable inert supports include activated carbon, alumina, silica, aluminosilicate, titania, zirconia, etc. Such supports should, as the solvents, be inert to the catalyst, reactants and products under the reaction conditions. In addition, the solids should preferably be finely subdivided, e.g., having particle sizes passing about 20 mesh but retained on about 400 mesh standard screen size and can have specific surface areas from about 10 to about 1000 square meters per gram.

The biphyllic ligand can be used in amounts from about 0.5 to about 100 times the stoichiometric equivalent of the ligand which is in complex association with the noble metal component of the catalyst. Generally, the complex can contain from about 1 to about 3 ligands per atom of the noble metal component. Preferably, the amount of biphyllic ligand is in excess of the stoichiometric equivalent of that contained in the complex and excess quantities from about 2 to about 100 times the stoichiometric amount can be used.

The noble metal-biphyllic ligand complex is employed in catalytic quantities in the reaction zone which can be amounts from about 0.0001 to about 10, preferably from about 0.01 to about 1, weight percent of the reaction zone content.

The reaction can be performed under relatively mild conditions including temperatures from about 30° to 300° C., preferably from about 70° to about 250° C. The carbon monoxide is supplied to the reaction zone in sufficient quantities to comprise from about 1 to about 1000 atmospheres absolute pressure and the carbon monoxide can comprise from about 5 to 100 percent of the gaseous phase in the reaction zone. The rate of reaction is increased by superatmospheric pressures of the carbon monoxide and, therefore, carbon monoxide pressures from about 10 to about 500 atmospheres are preferred. If desired, a suitable inert gas can also be charged to the reaction zone to reduce the partial pressure of the carbon monoxide and thereby moderate somewhat the reactivity of the system. A suitable gas for this purpose would be nitrogen or carbon dioxide.

The preceding conditions of temperature and pressure are maintained by conventional means. Since the reaction is exothermic, the reaction temperature can be maintained by suitable cooling of all or a portion of the reaction zone contents using heat exchange surfaces such as cooling coils. These coils can be installed in the reaction zone or can be used externally by continuously or intermittently removing all or a portion of the reaction zone contents and passing the withdrawn portion into contact with the heat exchange surfaces and returning the resultant cooled reaction medium to the reaction zone.

The process can be conducted continuously or batchwise, however, continuous process is preferred. In the latter technique, the catalyst is passed to the reaction zone in a suitable solvent or in an excess of the aldehyde and carbon monoxide is introduced into contact with the reaction media and catalyst in the reaction zone. A continuous withdrawal of the liquid phase in the reaction zone can be employed; this material can then be reduced in pressure to remove dissolved gases which can be recycled, cooled and then distilled to recover the desired saturated aldehyde. Because the reaction conditions are mild, the saturated aldehyde can remain in the reaction zone without encountering undue degradation to less desired products. Therefore, batchwise operation can be practiced by introducing the unsaturated aldehyde, water, carbon monoxide and any inert gas that may be employed into contact with the catalyst solution until a sufficient inventory of product is accumulated in the reaction zone. Thereafter the reaction can be discontinued and the product recovered by suitable steps, typically distillation.

The major product of the reaction is the saturated aldehyde. The saturated aldehyde is, of course, in the liquid phase in the reaction zone and can be recovered therefrom. The carbon dioxide byproduct of the reaction accumulates in the gaseous phase, diluting the carbon monoxide reactant. The carbon dioxide can be removed from the reaction by continuously or intermittently withdrawing a portion of the gas phase and replacing the withdrawn portion with carbon monoxide reactant. The saturated aldehyde product can, of course, be recovered by withdrawal of all or a portion of the reaction zone liquid contents and distillation or other separation steps, e.g., extraction, can be employed to purify the desired saturated aldehyde.

The invention will now be illustrated by the following example:

EXAMPLE

A steel bomb having a capacity of 300 milliliters is charged with 25 milliliters crotonaldehyde, 0.25 gram rhodium trichloride, 2 grams triphenylphosphine and 75 milliliters water. The bomb is closed and carbon monoxide is introduced to raise the pressure to 600 p.s.i.g. The bomb is then rocked and its contents are heated to 200° C. and maintained at that temperature for 4 hours. Upon completion of the reaction period, the final pressure is observed to be 300 p.s.i.g. and the bomb is cooled, depressured and the liquid contents are analyzed to discover the presence of 11 grams normal butyraldehyde. No butanol or unconverted crotonaldehyde is found in the reaction zone.

The invention has been illustrated by a specific example which illustrates the laboratory practice of the invention and serves to demonstrate results obtainable thereby. It is apparent that the invention can be practiced using the various reagents, catalysts, solvents and ligands disclosed herein, or equivalent thereto, without departing from the mode of practice of the invention illustrated in the preceding example.

I claim:

1. The saturation of monoethylenically unsaturated aliphatic hydrocarbon aldehydes having from 3 to about 20 carbons which comprises contacting the aldehyde with a reactant consisting of carbon monoxide and water under liquid phase condition containing catalytic quantities from 0.0001 to 10 weight percent of a rhodium salt of a strong inorganic acid in a complex with a biphyllic ligand having the following structure:

$$E(R)_3 \text{ or } P(OR)_3$$

wherein E is trivalent arsenic or phosphorus, wherein R is the same or different aryl having from 6 to about 10 carbons or alkyl having from 1 to about 10 carbons and wherein at least one of said R is aryl; said contacting being conducted at a temperature from about 70° to 250° C. and a pressure of carbon monoxide from about 1 to about 1000 atmospheres to produce a saturated aliphatic aldehyde having the same number of carbon atoms as said unsaturated aldehyde.

2. The method of claim 1 wherein said ligand is a diaryl or triaryl phosphine.

3. The method of claim 2 wherein said ligand is triphenylphosphine.

4. A method for producing saturated aldehydes from mono-ethylenically unsaturated aliphatic hydrocarbon aldehydes having from 3 to about 20 carbon atoms which comprises contacting a reactant consisting of carbon monoxide at a pressure of 1 to about 1000 atmospheres and an aqueous reaction medium containing from 10 to 50 weight percent of said unsaturated aldehyde and from about 0.01 to 1 weight percent of said unsaturated aldehyde and from about 0.01 to 1 weight percent of a catalyst comprising a rhodium salt of a strong inorganic acid in a complex with a triaryl phosphine having from 6 to 10 carbons in each aryl group; said contacting being conducted at a temperature between about 70° and 250° C. to produce a saturated aldehyde having the same number of carbons as said unsaturated aldehyde.

5. The method defined in claim 4 wherein said catalyst is rhodium chloride in a complex with from 1 to 3 moles of triaryl phosphine per mole of rhodium.

6. The method defined in claim 4 wherein said triaryl phosphine is triphenyl phosphine.

References Cited
UNITED STATES PATENTS

| | | | |
|---|---|---|---|
| 3,489,786 | 1/1970 | Dewhirst | 260—601 R |
| 2,786,863 | 3/1957 | Kölbel et al. | 260—604 HF |
| 2,194,186 | 3/1940 | Pier et al. | 260—690 |

OTHER REFERENCES

Jardine et al.: Journ. of the Chem. Soc., 1967, pp. 270–271.

BERNARD HELFIN, Primary Examiner

R. H. LILES, Assistant Examiner